Figure 1:
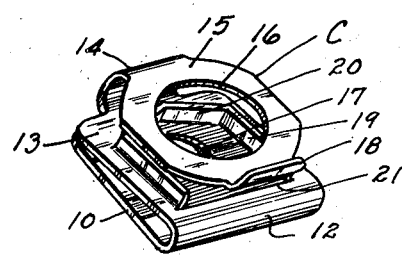

Feb. 12, 1946. G. A. TINNERMAN 2,394,729
FASTENING DEVICE
Filed Aug. 22, 1944

INVENTOR.
GEORGE A. TINNERMAN
BY
Bates, Teare, & McBean
ATTORNEYS

Patented Feb. 12, 1946

2,394,729

UNITED STATES PATENT OFFICE 2,394,729

FASTENING DEVICE

George A. Tinnerman, Cleveland, Ohio, assignor to Tinnerman Products, Inc., Cleveland, Ohio, a corporation of Ohio Application August 22, 1944, Serial No. 550,522

16 Claims. (Cl. 85—32)

This invention relates to a fastening device adapted to position a nut in registration with an opening in a support, and thus ready to receive a threaded bolt passing through the support. It is an object of the invention to provide such a device in a very simple form adapted to engage both the support and the nut effectively and hold them in proper registration. Another object is to provide the nut anchor of the invention in a form which may automatically clamp itself by snap action upon a support and may likewise by snap action clamp the nut to the fastener. Other objects and features of the invention will be apparent from the following description of a preferred embodiment shown in the drawing.

Figure 2:
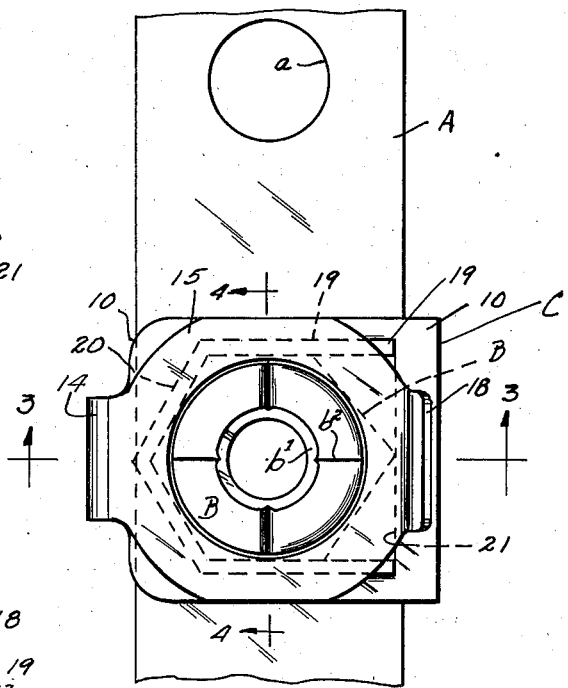
Figure 3:
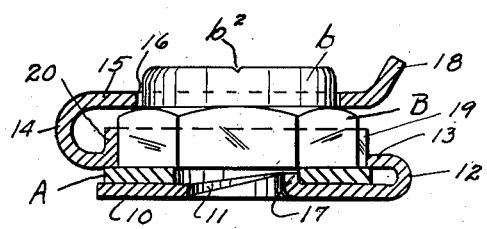
Figures 4, 5:
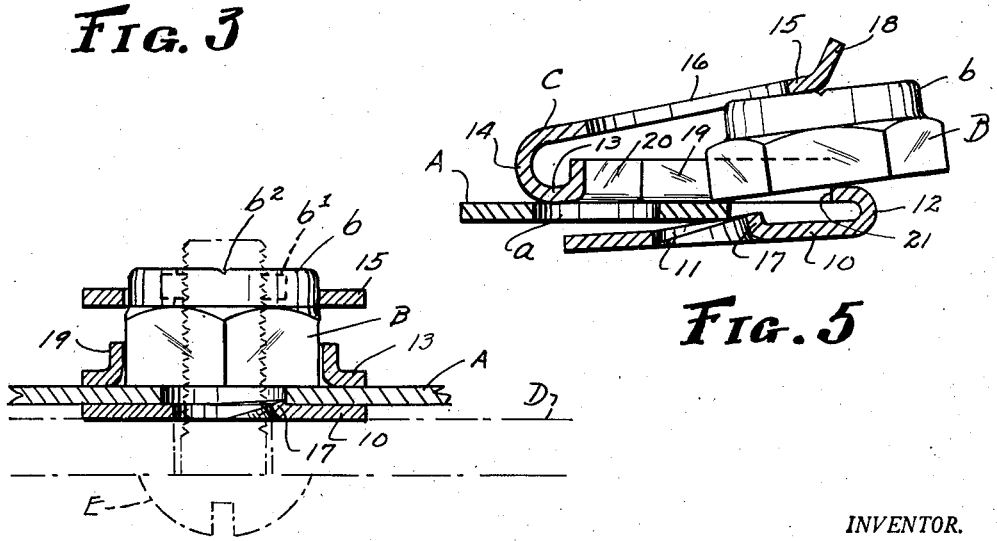

In the drawing, Fig. 1 is a perspective of my fastener; Fig. 2 is a plan, on a larger scale, of the fastener in position on a support and retaining a positioned nut; Fig. 3 is a cross section through the fastener and support with the nut in place, the plane of the section being indicated by the line 3—3 on Fig. 2; Fig. 4 is a cross section of the fastener and a portion of the support in a plane at right angles to Fig. 3, as indicated by the line 4—4 on Fig. 2, showing also the nut in corresponding elevation. Fig. 5 is a theoretic cross section illustrating the fastener in the act of being put in place on the support and a nut in the act of being put in place in the fastener.

Broadly speaking, my fastener comprises a substantially S-shaped member of resilient material arranged to engage and clamp a support in the region between one arm and the intermediate portion of the S, the intermediate portion and the other arm of the S being adapted to coact with the nut to hold it on the support. The support is indicated in Figs. 2 to 5 as a plate A having a bolt opening $a$. The nut B is shown as hexagonal with a rounded top portion $b$ common in nuts of castillated form or nuts carrying an internal elastic lock. The fastener C embraces the support and the nut locks them together.

My S-shaped fastener is made of a single piece of resilient sheet material preferably sheet metal. It has one extreme arm, shown as the lower arm 10, having an opening 11 for the passage of a bolt; then a return bend 12 leading to an intermediate region 13 formed with an opening adapted to embrace the nut B; then an oppositely facing return bend 14 leading into a top arm 15 having a hole 16 adapted to surround the cylindrical extension $b$ of the nut and rest on the shoulders at the corners of the flat faces.

The fastener may be snapped into place on the support by shoving it crosswise thereof until the opening 11 in the fastener registers with the opening $a$ in the support and the nut may be snapped into place by shoving it into the fastener directly beneath the top arm thereof, as hereinafter more fully explained.

The bottom arm 10 preferably is formed with a short upstanding arcuate wall 17 about the opening 11, the top of this wall being inclined from the top plane of the arm on one side of the opening 11 to the top of the short arcuate wall in the region nearest the return bend 12 of the arm. It results from this construction that as the fastener is shoved into place on the support the support operates on the inclined top of the wall 17 to cam the bottom arm downwardly until the wall reaches the opening $a$, whereupon it springs into that opening and the fastener becomes locked to the support as shown in Fig. 3.

The nut may be mounted within the intermediate arm 13 and beneath the top arm of the fastener by shoving it over the return bend 12 connecting the lower arm to the intermediate region, the upper arm being sprung up during the placing of the nut. The upper arm is provided with an upwardly inclined lip 18 at its end to enable the nut to cam the top arm readily upwardly by the act of inserting the nut.

The intermediate arm 13 of the fastener has formed about its opening an upstanding wall 19 adapted to engage the nut at its opposite flat faces so that the nut when mounted, while resting on the support, is effectively engaged on the opposite sides and prevented from rotating.

The parallel upstanding walls 19 on opposite sides of the nut extend in straight lines to a position near the return bend 12 and accordingly form a guide for insertion of the nut. The side walls 19 are braced by a cross wall 20 which also forms an effective stop for the forward face of the nut.

If the nut is of hexagonal form, as shown, the front wall 20 is V-shaped to accommodate two of the hexagonal faces on the advancing side of the nut. Movement of the nut in the opposite direction is prevented by the shoulder 21, Fig. 5, which results at the front of the opening through the intermediate arm.

When inserting the nut, as soon as its angular portion registers with the opening in the intermediate arm of the fastener, the opening 16 in the top arm also registers with the cylindrical extension $b$ of the nut and accordingly the top arm springs down over that extension into the position shown in Fig. 3, and firmly retains the nut on the support.

Fig. 2 indicates at b' a rubber washer held within the nut acting as a nut lock. The extreme top of the nut in this case is peened over the margin of the washer and forced down on it as indicated by the indentations b² in the top of the nut. This is a popular type of nut which my fastener is well adapted for holding in position.

If desired, the support A may be a long strip provided with a number of openings a and a gang of fasteners mounted thereon ready to provide for the reception of the nuts and the whole gang of mounted nuts retained in place on any member on any wall or beam by bolts in the nuts. Fig. 4 indicates in broken lines D such wall or beam and at E a bolt passing through registering openings in the member D, the lower arm of the fastener, the plate A, and the nut B.

It will be understood that the fastener may be mounted on the support and the nut thereafter mounted in the fastener, or the nut may be mounted in the fastener and the combined fastener and nut thereafter mounted on the support. Either order of mounting is intended to be illustrated in Fig. 5. In either case when the complete device is mounted the fastener locks itself in place on its support and locks the nut to the support so that the bolt opening in the lower arm of the fastener, the bolt opening in the support, and the bolt opening in the nut are all in registration.

If desired, the nut may be removed from the fastener by insertion of a suitable tool to pry up the upper arm of the fastener. Likewise the fastener may be removed from the support by the insertion of a suitable tool to pry down the lower arm of the fastener, but when mounted the fastener and nut are automatically held in proper position on the support against being displaced by inadvertent engagement with either the fastener or the nut.

I claim:

1. The combination with a support having an opening, of a threaded nut and a fastener adapted to hold the nut in registration with the opening in the support comprising a substantially S-shaped strip of resilient material, the top arm of the S having an opening into which a reduced portion of the nut extends, the intermediate arm having an opening and the lower arm of the S being adapted to coact with the intermediate arm to embrace the support, said lower arm having an upstanding flange adapted to occupy the opening in the support to lock the fastener thereto.

2. The combination with a support having an opening for the passage of a bolt, of a nut having a threaded opening, and an S-shaped fastener having its intermediate region and lower arm adapted to embrace the support and the intermediate region and upper arm adapted to position the nut on the support, said intermediate region having an opening as large as the exterior of the nut, and having an upstanding wall adapted to engage flat faces of the nut and the upper arm of the fastener having an opening and being adapted to press down on the nut and hold it seated on the support.

3. The combination with a support having an opening for the passage of a bolt, of a nut having its lower portion with an angular exterior and the upper portion with a round exterior, and an S-shaped fastener having its intermediate region and lower arms adapted to embrace the support and the intermediate region and upper arm adapted to position the nut on the support, said intermediate region having an opening as large as the exterior of the nut, said upper arm having an opening adapted to embrace the rounded upper portion of the nut and rest on the shoulders as the top of the flat sides of the nut.

4. The combination with a nut having an angular exterior, of a fastening device adapted to hold the nut on a support, said fastening device comprising a substantially S-shaped strip of resilient material formed to engage the support between one extreme arm and the intermediate region of the S, said intermediate region having an opening through it, a nut occupying the opening in the intermediate region, the fastener having a top arm bearing down on the nut to hold it on the support, the intermediate region having a pair of upright parallel flanges adjacent the opposite edges of the opening through the intermediate region, an upstanding flange on the intermediate region to engage the front portion of the nut being positioned, the space between the side flanges being open above the intermediate region adjacent the return bend connecting the intermediate region with the bottom arm whereby the nut may be shoved into place beneath the top arm and between the parallel flanges.

5. The combination with a nut having an angular exterior, of an anchorage device therefor adapted to be secured to a support for holding the nut on the support, said anchorage device having a portion with an opening as large as the exterior of the nut, upstanding flanges on opposite sides of the opening to engage the nut, said fastener having a portion to engage the top of the nut which portion is connected by a return bend with the portion first mentioned.

6. The combination with a nut having an angular lower portion and a rounded upper portion, of a fastener adapted to be attached to a support and having an angular opening adapted to surround the nut resting on the support, said fastener having a resilient top arm with an opening in it as large as the rounded portion of the nut but not as large as the angular portion of the nut whereby said arm may press the nut against the support.

7. The combination with a nut having an externally angular lower portion and a rounded upper portion, of a fastener having an angular opening adapted to engage the lower portion of the nut and an upper portion connected by a return bend with the first-mentioned portion, said upper portion having an opening adapted to surround the rounded portion of the nut with the upper portion bearing on the shoulders provided at the top of the flat sides of the nut, the portion of the fastener which has the angular opening occupied by the nut being provided with parallel opposed flanges engaging opposite sides the nut, said flanges extending across the front of the nut to limit its movement toward the return bend but there being space at the rear between the flanges enabling the nut to be shoved laterally into place between the flanges and beneath the top arm.

8. The combination with a nut having an externally angular lower portion and a rounded upper portion, of a fastener having an angular opening adapted to engage the lower portion of the nut and an upper portion connected by a return bend with the first-mentioned portion, said upper portion having an opening adapted to surround the rounded portion of the nut with the upper portion bearing on the shoulders provided at the top of the flat sides of the nut, the extreme end of the top arm being bent upwardly so that the insertion of the nut may cam the arm upwardly and the arm thereafter returning by the resilience of the fastener may press down on the shoulders of the nut.

9. A fastening having one portion with an angular opening in it and an upstanding flange adjacent the opening, said opening being adapted to receive a nut with the flange engaging a side of the nut, said fastener having a top arm connected with a portion first mentioned by a return bend, said top arm being adapted to resiliently press the nut against the support.

10. A fastener made of a single piece of resilient sheet material having a portion with an angular opening adapted to receive a nut and a second portion connected by a return bend with the portion first-mentioned, said second portion having a round opening of smaller size than the angular opening in the first portion but large enough to surround a reduced portion of the nut and bear against the angular portion of the nut.

11. As a new article of manufacture, a substantially S-shaped fastener of resilient sheet material having registering openings through its three arms, the opening through the intermediate portion of the S being angular and there being upstanding parallel walls on opposite sides of that opening.

12. As a new article of manufacture, a substantially S-shaped fastener of resilient sheet material having registering openings through its three arms, the opening through the intermediate portion of the S having an angular contour and the opening through the upper arm of the S being circular and of less diameter than the maximum distance across the angular opening.

13. An S-shaped fastener of resilient sheet material having openings through its three arms, there being an upstanding flange with an inclined top about the opening through the bottom arm and the opening through the intermediate arm being angular and there being an upstanding flange on opposite sides thereof and the opening through the top arm being circular and of less diameter than the maximum cross dimension of the angular opening.

14. The combination with a nut, of a fastener adapted to position the same with reference to a support, said fastener being adapted to be secured to the support and having a portion with an opening through it as large as the exterior of the nut, the edge of said opening adapted to embrace the nut when seated on the support, the fastener having an upstanding wall adapted to engage opposite faces of the nut and having a resilient top portion movable with reference to the portion having the opening and adapted to extend across the nut and press downwardly on it to hold it against the support.

15. A fastener for holding on a support a nut having a lower portion with an angular exterior and an upper portion with a round exterior, said fastener being an S-shaped member of resilient material having its intermediate arm and lower arm adapted to embrace the support and the intermediate arm and the upper arm adapted to position the nut on the support, said intermediate arm having an opening with an angular exterior providing an edge adapted to embrace the angular lower portion of the nut, the upper arm having a round opening large enough to surround the round upper portion of the nut to be fastened and small enough to rest on the shoulders at the junction of the round portion and the angular portion of the nut.

16. A fastener for holding on a support a nut having a lower portion with an angular exterior and an upper portion with a round exterior, said fastener being an S-shaped member of resilient material having its intermediate arm and lower arm adapted to embrace the support and the intermediate arm and the upper arm adapted to position the nut on the support, said intermediate arm having an opening adapted to surround the angular lower portion of the nut, and having a pair of parallel upstanding flanges adapted to engage opposite faces of said angular portion, the space between said flanges being uninterrupted at the front to allow the lateral insertion of the nut, the upper arm having a round opening large enough to surround the round upper portion of the nut to be fastened and small enough to rest on the shoulders at the junction of the round portion and the angular portion of the nut.

GEORGE A. TINNERMAN.